United States Patent
Schulte et al.

(12) 
(10) Patent No.: US 6,457,588 B1
(45) Date of Patent: Oct. 1, 2002

(54) TREATMENT OF FLUID HAVING LOST CIRCULATION MATERIAL

(75) Inventors: David L. Schulte, Broussard, LA (US); Thomas C. Adams, Hockley; David W. Largent, Cleveland, both of TX (US)

(73) Assignee: Varco I/P, Inc., Houston, TX (US)

( * ) Notice: Subject to any disclaimer, the term of this patent is extended or adjusted under 35 U.S.C. 154(b) by 0 days.

(21) Appl. No.: 09/970,152

(22) Filed: Oct. 3, 2001

Related U.S. Application Data

(63) Continuation-in-part of application No. 09/749,263, filed on Dec. 27, 2000, and a continuation-in-part of application No. 09/745,279, filed on Dec. 20, 2000.

(51) Int. Cl.$^7$ .................. B07B 1/46; B01D 39/08; B01D 39/10; E21B 21/06
(52) U.S. Cl. ............... 210/388; 210/780; 210/785; 210/489; 210/499; 209/401; 209/403; 175/66; 175/72
(58) Field of Search ............ 210/780, 785, 210/388, 489, 499; 209/401, 403; 175/66, 72

(56) References Cited

U.S. PATENT DOCUMENTS

| | | | |
|---|---|---|---|
| 2,929,464 A | | 3/1960 | Sprouse |
| 3,716,138 A | | 2/1973 | Lumsden .............. 209/401 |
| 4,696,751 A | * | 9/1987 | Eifling |
| 5,876,552 A | | 3/1999 | Bakula .............. 156/308.2 |
| 5,921,399 A | | 7/1999 | Bakula .............. 209/272 |
| 5,944,197 A | * | 8/1999 | Baltzer et al. |
| 6,237,780 B1 | * | 5/2001 | Schulte |

OTHER PUBLICATIONS

The Right Screen Makes the Difference, CPI Group Inc Oilfield Solids Control Division, 190.
Lost circulation technique can solve drilling problems, Messenger, The Oil & Gas Journal, pp. 94–98, May 27, 1968.
How to combat lost circulation, Messenger, The Oil & Gas Journal, pp. 71–97, May 13, 1958.
Manual of Drilling Fluids Technology, Lost Circulation, NL Baroid/NL. Industries, Inc., 1988.
Southwestern Wire Cloth Oilfield Screens, March, 1998.

* cited by examiner

*Primary Examiner*—Thomas M. Lithgow
(74) *Attorney, Agent, or Firm*—Guy McClung

(57) ABSTRACT

A method for separating fluid and fibrous lost circulation material from a mixture of fluid, drilled cuttings and fibrous lost circulation material, the method including introducing the mixture onto a screen assembly that has at least two layers of screening material and including at least a first layer over a second layer, the layers with rectangular openings, the first layer having first rectangular openings each having a first width and a first length, and the second layer having second rectangular openings each having a second width and a second length, the ratio of the first length to the first width ranging between 1.55 and 2.00, the ratio of the second length to the second width ranging between 1.55 and 2.00, the ratio of the first length to the second width ranging between 0.95 and 1.05, and the lengths of the first rectangular openings parallel to lengths of the second rectangular openings.

34 Claims, 10 Drawing Sheets

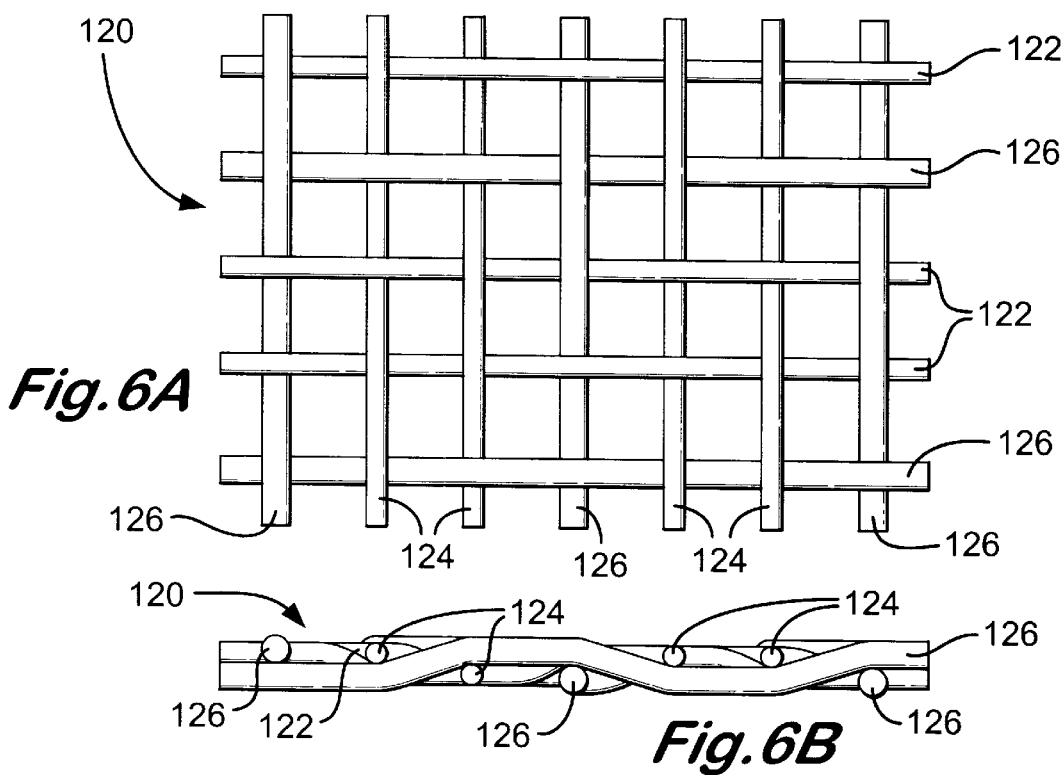
*Fig.6A*
*Fig.6B*
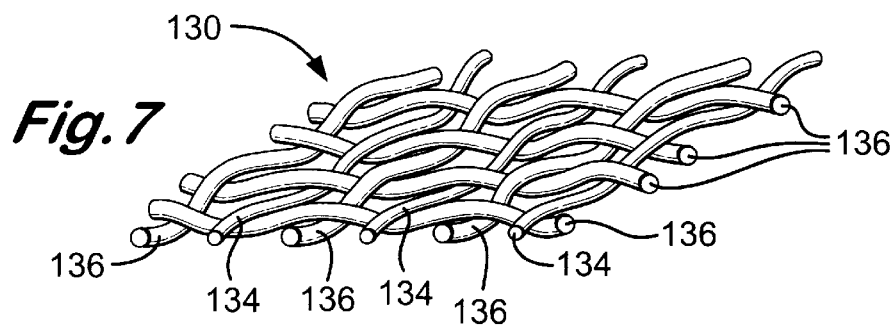
*Fig.7*
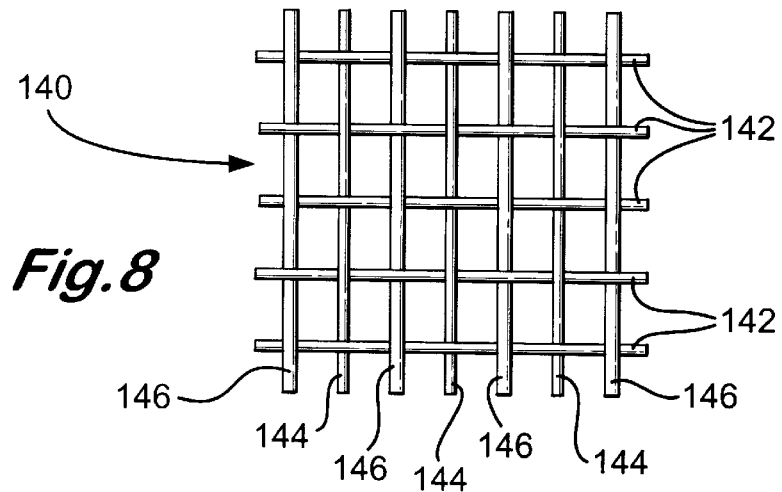
*Fig.8*

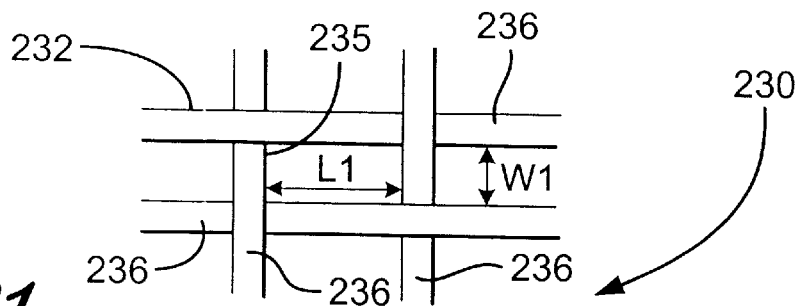
Fig.21
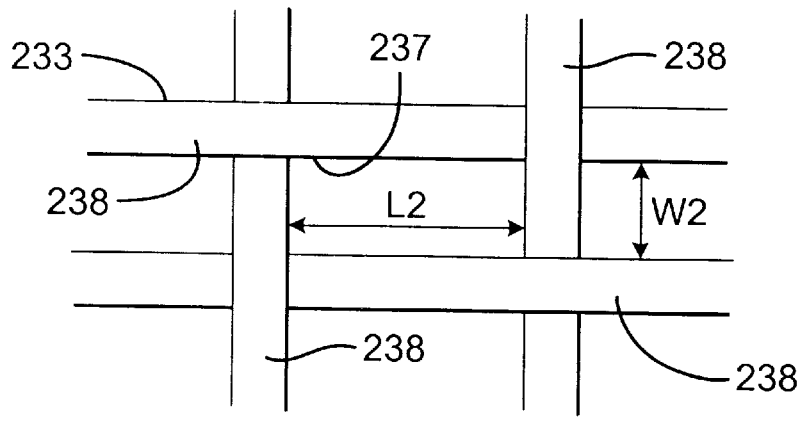
Fig.22
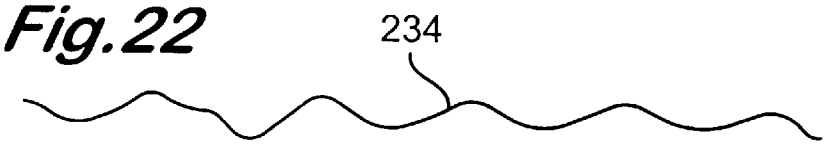
Fig.23A
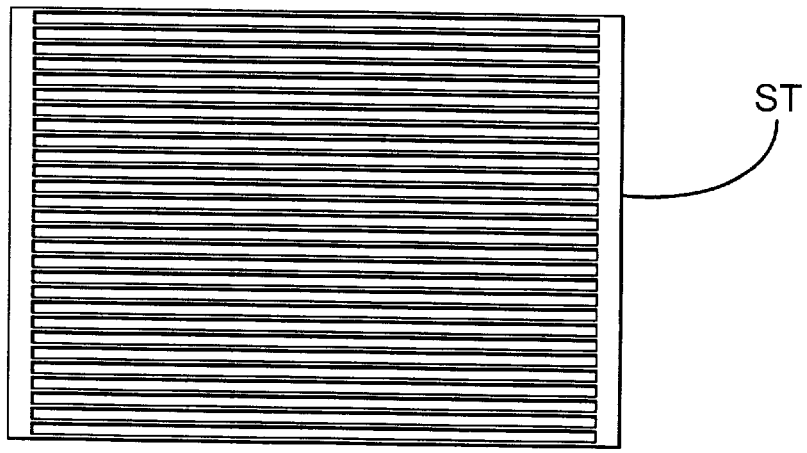

TREATMENT OF FLUID HAVING LOST CIRCULATION MATERIAL

RELATED APPLICATION

This is a continuation-in-part of U.S. application Ser. Nos. 09/745,279 filed Dec. 20, 2000 and Ser. No. 09/749,263 filed Dec. 27, 2000 all co-owned with the present invention and application and all incorporated fully herein for all purposes.

BACKGROUND OF THE INVENTION

1. Field of the Invention

This invention is directed to methods for separating drilling fluid from a mixture of such fluid and lost circulation materials and to apparatuses useful in such methods.

2. Description of Related Art

Often in drilling a wellbore, the circulation of drilling fluid to and then away from the drill bit ceases due to the porosity of the formation and/or due to fracturing of the formation through which the wellbore is being drilled. Drilling fluid pumps into the fractured formation rather than being returned to the surface. When circulation is lost, it is usually supposed that the lost circulation occurred at some specific depth where the formation is "weak", and that the fracture extends horizontally away from the borehole. Expressions used to describe rocks that are susceptible to lost returns include terms like vugular limestone, unconsolidated sand, "rotten" shale, and the like. Whether fractures induced by excessive mud pressure are parallel to the axis of the borehole (vertical) or perpendicular to the axis of the borehole (horizontal) is a subject of some controversy.

To fill or seal off a porous formation or to fill or seal off a wellbore fracture so that a proper route for drilling fluid circulation is re-established, a wide variety of "lost circulation materials" have been pumped into wellbores. For purposes of classification, some lost circulation materials can generally be divided into fibers, flakes, granules, and mixtures.

In certain prior art screens, square mesh wire cloths have been used with relatively fine wire diameters in multiple layers because of their resistance to blinding, e.g. with one or more support layers and two screening layers. The ratio between these meshes has generally been between about 1.1 and 1.7. Certain of these screen combinations have difficulty in handling LCM material and the material often blinds these screens. Oblong opening meshes with length to width ratios between 1.55 and 2.0 have also been used in the past for their resistance to blinding. As the ratio increases between the meshes, blinding decreases but strength also decreases. As the wire diameter increases, the resistance to blinding decreases, but the strength increases. However, when multiple layers of oblong cloths have been used in certain prior art screens, the ratio of the length of the openings at adjacent layers has been 2 or greater and of the width of the openings of adjacent layers has been 1.6 or greater. Attempts have been made to use oblong meshes with increasingly large ratios.

Typical known shale shaker screens or screen assemblies with square mesh openings often are clogged when attempts are made to separate lost circulation materials from a mixture of them with fluid that has been pumped down a wellbore. Stringy, fibrous, and/or fibril material ("fibrous" material) can wrap around a wire of a screen and/or bridge a mesh opening without passing through the screen. In certain particular circumstances there have been problems with commercially available ULTRA-SEAL lost circulation material that has fibrous material in it. If components of this material which swell are caught between two screen mesh layers, they swell and plug the screen rather than going through the screen with the drilling fluid (while drilled cuttings, debris, etc. move on the top of the screen assembly and exit the shaker or vibratory separator apparatus). Although the prior art discloses the use of screens with non-square openings for use on shale shakers for treating mixtures of drilling fluid and drilling solids, the present inventors are unaware of the use of prior art screen(s) and/or screen assemblies with non-square mesh openings in methods for separating fluid and fibrous lost circulation materials from drilled cuttings and believe it is not obvious to use screens with non-square openings with relatively more opening area to successfully treat such fluids.

FIGS. 1A and 1B show a prior art screen 22 as disclosed in U.S. Pat. No. 2,723,032 with a coarse mesh wire screen, or cloth 23 that provides a backing screen or cloth of the unit. A fine mesh wire screen 24 is superimposed or mounted upon the backing screen 23. The screen unit 22 has its coarse backing wire mesh or cloth coated or covered preferably with rubber or some suitable rubber or synthetic rubber composition. The strands are indicated at 25 and the covering or coating at 26. Since all of the strands 23 are coated or covered, there is, of course, rubber-to-rubber contact between these strands of the coarser mesh screen 23. The backing screen of cloth 23 is of the roller flat-top type and of any coarse size such, for example, as three or four mesh. The mesh of the finer mesh wire screen 24 varies, in accordance with the separating job to be done. For example, the mesh of the fine wire screen or cloth 24 may vary from the order of minus 20 (−20) to the order of minus 325 (−325).

FIGS. 2A and 2B disclose a screen 30 as disclosed in U.S. Pat. No. 4,696,751 with a first mesh screen with rectangular dimensions of width and length. A second screen 38 is held in superimposed abutting relationship to the first screen 32. The second 38 has width and length dimensions. The length dimensions of the first screen is larger than length dimension of the second screen, and the width dimension of the first screen is smaller than the width dimension of the second screen.

FIGS. 3A and 3B disclose screens 50 and 53 shown in U.S. Pat. No. 5,626,234 which has an upper cloth 51 and lower cloth 52. The upper cloth 51 is formed from woven stainless steel wire in the range 0.19 mm to 0.036 mm diameter and 60–325 mesh, (i.e. number of strands per inch) while the lower cloth 52 is formed from woven phosphor bronze wire in the range 0.45 mm to 0.19 mm diameter and 20–40 mesh. A screen 53 in FIG. 3B has an upper cloth 54 like the upper cloth 51 (FIG. 3A) and a lower cloth 55 woven from stainless steel wire having a nominal diameter in the range 0.20 to 0.45 mm diameter and typical 30 mesh, and is coated with an epoxy based material, or Molybdenum Disulphide, or Teflon (Registered Trade Mark), to a thickness in the range 5 to 50 microns typically 20 to 40 microns. Multiple passes of the wire through a coating process or through a succession of such processes may be necessary to achieve the desired coating thickness. The wires 57, 58, 59 are shown in cross-section to show the outer material coatings 67, 68, 69 (not to scale). The wire 64 is shown with the coating scraped from one end.

There has long been a need for a method for efficiently and effectively separating fluid and fibrous lost circulation materials from a mixture of them with drilled cuttings, debris, etc. There has long been a need, recognized by the present inventors, for such a method that does not result in clogged or plugged screen assemblies used for such separating.

SUMMARY OF THE PRESENT INVENTION

The present invention, in certain aspects, discloses methods for separating fluid and fibrous lost circulation material from a mixture of fluid, drilled cuttings and fibrous lost circulation material, the methods including: introducing the mixture onto a screen assembly that is vibrating, e.g., vibrated in a shale shaker, for passage of the fluid and fibrous lost circulation material through the screen assembly and for separation from the mixture of drilled cuttings, the screen assembly having at least two layers of screening material one on top of the other and including at least a first layer over a second layer, each layer having screen mesh with rectangular openings as viewed from above, the first layer having first rectangular openings, and the second layer having second rectangular openings, each of the first rectangular openings having a first width and a first length, and each of the second rectangular openings having a second width and a second length, the ratio of the first length to the first width ranging between 1.55 and 2.00, the ratio of the second length to the second width ranging between 1.55 and 2.00, the ratio of the first length to the second width ranging between 0.95 and 1.05, and the lengths of the first rectangular openings are parallel to lengths of the second rectangular openings; and in one particular aspect the ratio of the first length to the first width is about 1.6, the ratio of the second length to the second width is about 1.7, and the ratio of the first length to the second width is about 1.0. Such a screen assembly may have a screen support, e.g, but not limited to, any strip support, frame, or plate discussed or referred to below.

The present invention, in certain aspects, discloses a method for using a vibratory separator with one or more screen assemblies to separate fluid from a mixture of such fluid and fibrous lost circulation material that is pumped down a wellbore in an effort to remedy a lost circulation problem so that the fluid to be recovered and the fibrous lost circulation material passes through the one or more screen assemblies and the drilled cuttings, etc. move off the top of the one or more screen assemblies. In one aspect such a method employs a screen or screen assembly that has at least one layer of screen mesh that has non-square openings, e.g. but not limited to non-square rectangular openings. Fluid flow across such a screen or screen assembly may be in the lengthwise direction of the no-square openings or transverse to the length. It is within the scope of the present invention to use any suitable known vibratory separation apparatus or shale shaker with one or more screen assemblies according to the present invention in methods according to the present invention.

In certain particular aspects such a method employs a screen assembly with a lowermost screen of relatively large mesh, e.g. between 15 and 50 mesh; a middle screen of between 105×64 and 170×105 mesh (i.e. 105 openings in one direction, 64 openings in the other, 170 openings in one direction 105 openings in the other direction) or a middle screen of between 46×29 and 145×90 mesh;) with openings that are non-square rectangular openings between 333.4 and 178.4 microns long and between 198.7 and 106 microns wide, or between 425 and 127 microns long and between 748 and 234 microns wide; and a top mesh between 240× 150 and 170×105 (or 76×49) mesh with non-square rectangular openings that are about 136.3 to 72.8 microns wide and 198.7 to 106 microns long. Wire between about 0.016 to 0.0045 inches in diameter is used for the lowermost screen; between 0.0014 to 0.0025 inches in diameter for the middle screen; and between 0.0012 and 0.0018 inches in diameter for the top screen. Alternatively any screen pattern or weave with any wires disclosed herein may be used.

In certain aspects by using non-square rectangular openings a larger opening area is presented to a fiber than is presented by a square opening with a side equal to the width of the rectangular opening (i.e. the length of the non-square rectangular opening is longer than the length of the side of the square). A fiber caught on a wire and/or bridging such a non-square rectangular opening while connected to one or two wires or laying across two wires of such an opening, does not block flow through the non-square opening to the extent that such a fiber would block flow through the square opening, i.e. the percentage of area of the non-square opening blocked by the fiber is less than the percentage of the total area of the square opening that would be blocked by the fiber. In certain aspects in such a situation there may also be more fluid flow against such a fiber and past the fiber's surfaces when using the non-square openings as compared to the amount of such fluid flow through a square opening. Thus loosening and/or wash through of the fiber may be facilitated by using the non-square openings. Such facilitation may be further enhanced by flowing the fluid to be treated in the general direction of the length of the non-square rectangular openings.

In certain prior art screens that use square mesh openings fibrous lost circulation material can become trapped between the top two meshes of a screen. This is inhibited or reduced by using screens according to the present invention with non-square openings as described above.

It is contrary to the accepted teaching and skill in the art to use screens with the relatively large non-square openings to separate fluid from fibrous lost circulation materials. For those solids that are in a mixture to be treated and are to be moved off the top of the screen assemblies and that are generally spherical and therefore have a largest dimension; the width (not the length) of a rectangular opening determines if the solids will or will not pass through such an opening and the relatively longer length of the rectangular opening permits fibrous material to pass through with the fluid to be recovered that passes through the screen assemblies. To achieve this in certain aspects the middle or second from the top of a multi-layer screen assembly has oblong or rectangular openings (as viewed from above) to assist the passage of fibrous lost circulation material through the screen assembly and to speed the passage of such materials through the screen assembly so that they are not resident between screen layers a sufficient amount of time to cause plugging problems by swelling. In other aspects the top layer of screening material may also have such oblong or rectangular openings. Also, the length of the openings in the middle or second-from-the-top layer may be parallel to the lengths of the openings of the top layer or these lengths may be at right angles or at any desired angle to each other (as viewed from above).

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide:

New, useful, unique, efficient, nonobvious methods for separating fluid and fibrous lost circulating material from a mixture that includes drilled cuttings;

Such methods in which the clogging or plugging of screens of a vibratory separator is inhibited;

Such methods in which screens with non-square openings, e.g. generally oblong or rectangular openings, are used;

Such methods in which the resident time in a screen assembly of material that can swell is reduced and the passage of such material through the screen assembly is facilitated;

Such methods in which fluid flow is in the general direction of the length of the non-square openings (of either a top layer of screening material of a screen assembly or a layer below the top layer) or transverse thereto; and Such methods in which a multi-screen screen assembly is used.

Such methods in which a multi-screen screen assembly is used.

The present invention, in certain aspects, discloses a screen with wires of varying diameter in a single screen cloth layer. In one aspect, alternate wires (e.g. but not limited to, every other wire, every third wire, every fourth wire, or every fifth wire) in a screen warp direction are of a larger diameter than the other wires of the screen. In other aspects, alternate wires (e.g. but not limited to, every other wire, every third wire, every fourth wire, or every fifth wire) in a screen shute direction are of a larger diameter than the other wires of the screen. Alternatively, all wires in a warp direction or in a shute direction may be of the larger diameter.

It is, therefore, an object of at least certain preferred embodiments of the present invention to provide:

New, useful, unique, efficient, nonobvious methods for screening lost circulation material with vibratory separators; and New useful, unique, efficient, nonobvious vibratory separators (e.g. shale shakers) with such screens.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 6A is a top view of a screen according to the present invention. FIG. 6B is a cross-section view of the screen of FIG. 6A.

FIG. 7 is a perspective view of a screen according to the present invention.

FIG. 8 is a top view of a screen according to the present invention.

FIG. 21 is a schematic top view of screening material used in screen assemblies according to the present invention and in methods according to the present invention.

FIG. 22 is a side view of part of a screen according to the present invention.

FIGS. 23A–23C are top views and FIG. 23D is a perspective view of supports for screens according to the present invention.

DESCRIPTION OF EMBODIMENTS PREFERRED AT THE TIME OF FILING FOR THIS PATENT

Figure 1A:
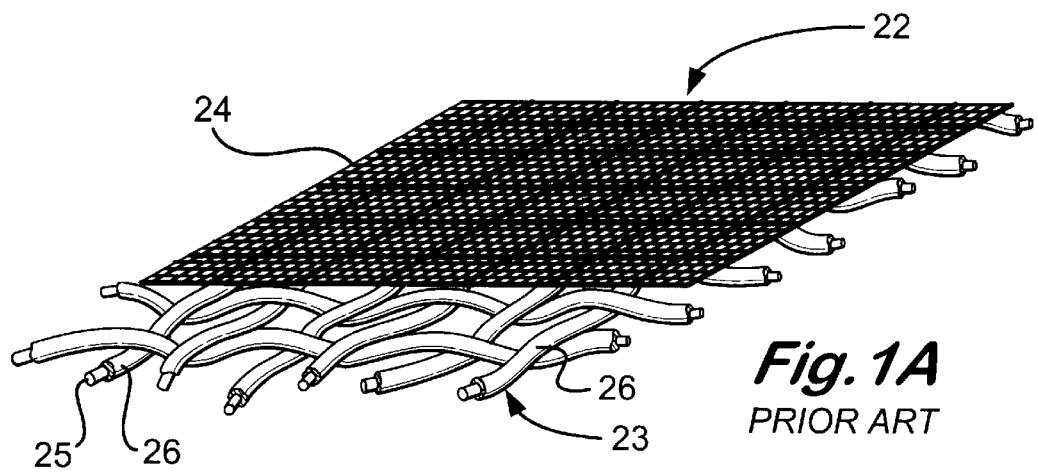
FIG. 1A is a perspective view of a prior art screen.

FIGS. 19A–19D show a screen assembly 210 according to the present invention which has a lowermost screen 212, a middle screen 214, and a top most screen 216. Any one of these three screens may be deleted. The screen assembly 210 may have any known side hookstrips; and/or any known screen support (indicated by numeral 213) including, but not limited to, support strips, frame and/or supporting perforated plate (each of which is not the legal equivalent of the others). Any two adjacent or all three screens may be bonded or connected together in any known manner.

Figure 19A:
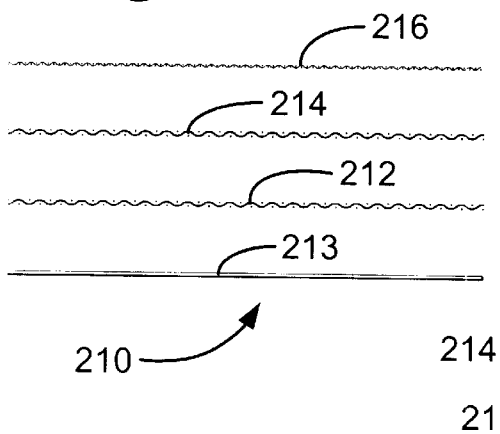
FIG. 19A is a side exploded view of a screen assembly according to the present invention.
Figure 19B:
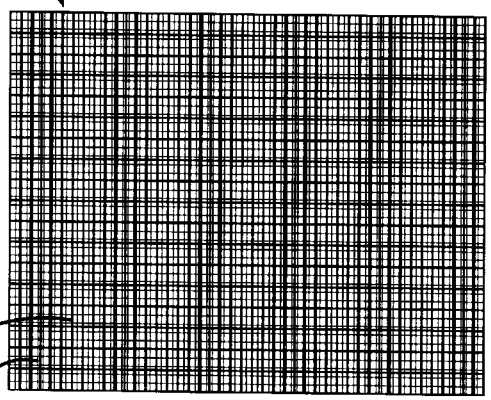
FIG. 19B is a top view of the screen assembly of FIG. 19A.
Figure 19C:
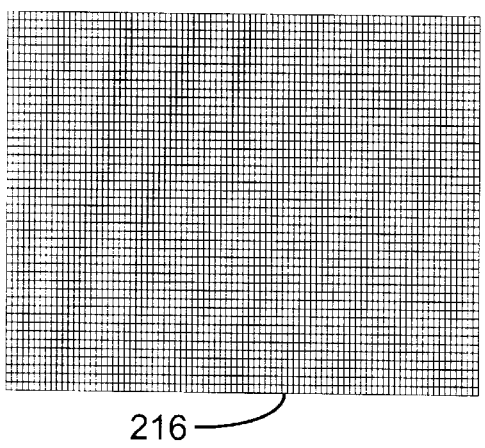
FIG. 19C is a top view of the top screen of the screen assembly of FIG. 19A.

The top screen 216 (see FIG. 19C) is woven of wires about 0.0012 to 0.0018 inches in diameter made of any suitable material, including but not limited to, metal, plastic, steel, and stainless steel, e.g. 304 or 316 SS. Any suitable known weave and weave pattern may be used. In the embodiment of FIG. 19C as viewed from above, the openings between intersecting wires are non-square and rectangular. In the embodiment shown the length of each rectangle is greater than the width. In certain aspects, the length of the rectangles is between two to two-and-a-half times the width of the rectangle; but any non-square rectangular shape may be used. Also, the non-square openings in a single screen may be of different size and dimensions. The wires may be made of any known screen material. In certain aspects the width of the rectangular openings is chosen so that drilled cuttings are separated on top of the screen assembly and are movable off the top of the screen without passing through the screen assembly and the fluid to be recovered and fibrous lost circulation material passes through the screen assembly. The length of the rectangular openings is chosen so that the fibrous lost circulation material passes relatively speedily through the screen assembly and has insufficient time to swell between mesh layers and thus clog or plug the screen assembly.

Figure 19D:
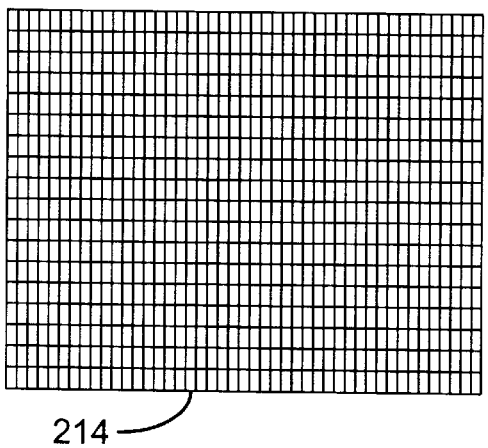
FIG. 19D is a top view of the middle screen of the screen assembly of FIG. 19A.

FIG. 19D shows the middle screen 214 is woven of wires about 0.0014 to 0.0025 inches in diameter made of the same material as the top screen. Any suitable known non-square weave and weave pattern may be used. In the embodiment of FIG. 19C as viewed from above, the openings between intersecting wires are non-square and rectangular. Any non-square rectangular shape may be used. Also, the non-square openings in a single screen may be of different size and dimensions. The wires may be made of any known screen material.

Figure 20:
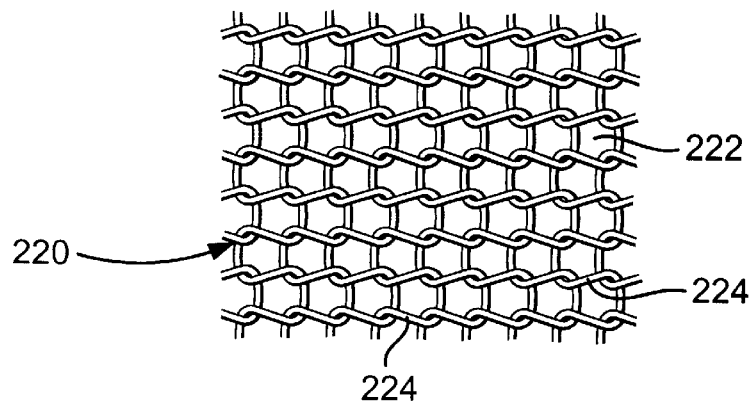
FIG. 20 is a top view of screening material for use in methods according to the present invention.

FIG. 20 shows a type of woven wire pattern 220 which has non-square openings 222 viewed from above that are not the equivalent of the non-square rectangular openings referred to above. The wire pattern 220 is made of any suitable wires 224 interlinked together. Wires with any diameter referred to above or any other suitable diameter may be used and the wire material may be any referred to above. Some or all of the wires may be bonded at points of intersection or various wires or areas of wires may be left loose so that some relative movement between adjacent wires is permitted. The size and dimensions of the openings through the pattern, as viewed from above, may be any desired size and dimensions. It is within the scope of this invention for any screen used in a multi-screen screen assembly for a vibratory separator to have a weave as in the pattern 220 in any of the aspects mentioned above and for such interlinked mesh to include all the surface area, part of it, or parts of it in a screen according to the present invention.

The general direction of fluid flow over any screen or screen assembly according to the present invention may be either in the direction of the length of the non-square openings (e.g. right to left or left to right for FIGS. 19C, 19D) or in the direction of the opening's width (top to bottom or vice versa in FIGS. 19C, 19D).

Figure 23C:
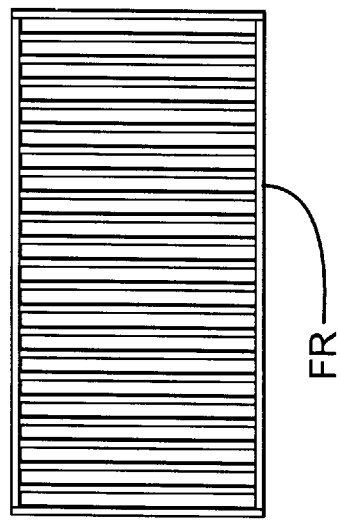
Figure 23B:
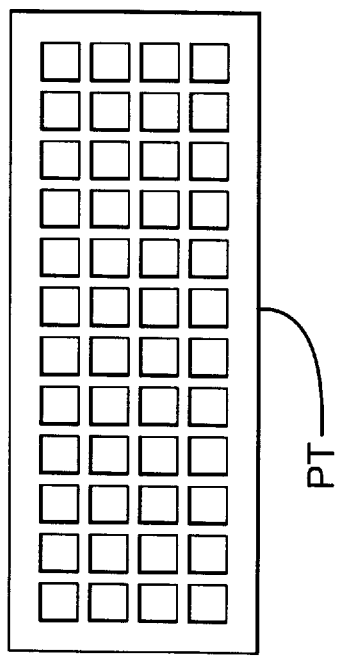
Figure 23D:
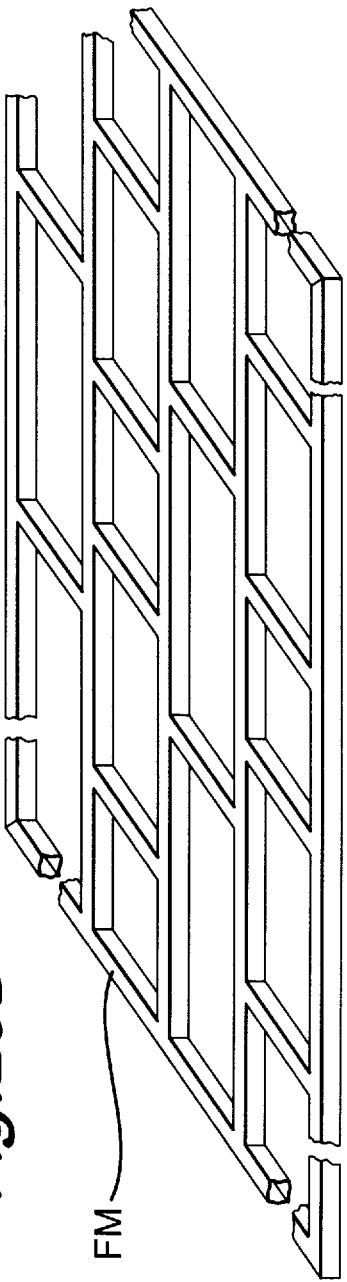

FIG. 21 shows schematically a dual layer screen 230 according to the present invention which has a top mesh 232 and a lower mesh 233. Optionally a coarse mesh layer 234—see FIG. 22—(and/or a support, frame or plate beneath the layers 232, 233, or beneath the layer 234) may be used. The top mesh layer 232 has openings 235 with a length L1 and a width W1. In certain aspects the ratio of the wire diameter of the wires 236 of the top mesh layer 232 to L1 is between 2.2 to 3.4 and he ratio of this wire diameter to W1 is between 4.1 and 5.9. the "support" may be a strip support as shown in FIG. 23A as the support ST and as described in U.S. Pat. No. 6,269,953 incorporated fully herein for all purposes, or any support described in this patent, or any known strip support. The "frame" may be any known frame used with screens for use on vibratory separators and shale shakers,including, but not limited to: tubular frames, frames made of members that are bent or formed into shape, frames with four outer sides, frames with four outer sides and a plurality of crossmembers extending between the sides, a frame FR as shown in FIG. 23C, a frame FM as shown in FIG. 23D, and such a frame as the frame FM as described in U.S. Pat. No. 5,417,858 incorporated fully herein for all purposes. The "plate" maybe any suitable known perforated plate used for screens for use with vibratory separators and shale shakers, including, but not limited to: a perforatred plate PT as shown in FIG. 23B, any perforated plate disclosed or referred to in U.S. Pat. No. 6,269,953, and any plate disclosed in U.S. Pat. No. 5,417,858.

The mesh layer 233 has openings 237 with a length L2 and a width W2. In certain aspects the wires 238 of the lower mesh layer 233 have a diameter-to-L2 ratio between 2.2 to 3.4 and a diameter-to-W2 ratio between 4.1 and 5.9. The present inventors have determined that such a screen (like the screen 230) resists blinding by fibrous lost circulation material when the ratios of L1 to W1 and of L2 to W2 are between 1.55 and 2.00 and the ratio of L1 to W2 is between 0.95 and 1.05.

Certain screens according to the present invention have layers as follows: (e.g. "76×45/0.0034" means a screening material layer with a mesh of 76 in one direction, 45 in the other direction, with wires of 0.0034 inch diameter; and "19/0.0126" means a coarse 19 mesh layer with wire of 0.0126 inch diameter with 19 wires in each direction):

1. 76×45/0.0034 46×29/0.005 19/0.0126
2. 105×64/0.0025 76×45/0.0034 19/0.0126
3. 120×76/0.0023 76×45/0.0034 19/0.0126
4. 145×90/0.0019 90×50/0.003 19/0.0126
5. 170×105/0.0017 105×64/0.0025 19/0.0126
6. 205×125/0.0014 120×76/0.0023 19/0.0126
7. 240×150/0.0013 145×90/0.0019 19/0.0126

Any screen assembly disclosed herein may be made according to the present invention so that its layers' length to width ratios are within the ranges stated above.

The present invention, therefore, provides in certain, but not necessarily all embodiments, a method for separating fluid and fibrous lost circulation material from a mixture thereof with drilled cuttings, the method including introducing the mixture onto a screen assembly that is vibrating for passage of the fluid and fibrous lost circulation material through the screen assembly and for separation of the drilled cuttings from the fluid, the screen assembly with a plurality of screens one on top of the other and including at least a first screen and a second screen, the first screen with a screen mesh woven with first non-square openings as viewed from above. Such a method may have one, some, or all of the following; wherein the first non-square openings of the first screen are non-square rectangular openings; wherein the second screen is a screen mesh woven with second non-square openings (e.g. rectangular) as viewed from above; wherein the first non-square openings are larger in area as viewed from above than the second non-square openings; wherein the screen assembly has a screen support; wherein the screen support includes a series of spaced-apart strips, a perforated plate, and/or a frame; wherein the mesh of the first screen is bonded to and/or mechanically connected to the mesh of the second screen; wherein the fluid is drilling fluid; wherein at least one of the first screen and second screen is bonded to the screen support; wherein at least one of the first screen and second screen is mechanically connected to the screen support; wherein the first non-square openings have a length and a width and the fluid flows on the screen in a direction generally parallel to the length of the first non-square openings; wherein the second non-square openings have a length and a width and the fluid flows on the screen in a direction generally parallel to the length of the second non-square openings; wherein the first non-square openings are generally rectangular and the second non-square openings are generally rectangular and, as viewed from above, lengths of the first non-square openings are transverse to lengths of the second non-square openings; wherein the first non-square openings are generally rectangular and the second non-square openings are generally rectangular and, as viewed from above, lengths of the first non-square openings are parallel to lengths of the second non-square openings; wherein the screen assembly includes at least one screen with at least a portion thereof comprising interlinked screening material; and/or wherein the screen assembly includes a third screen connected (e.g. bonded and/or mechanically connected) to at least one of the first and second screen, or to both of them.

Figure 4A:
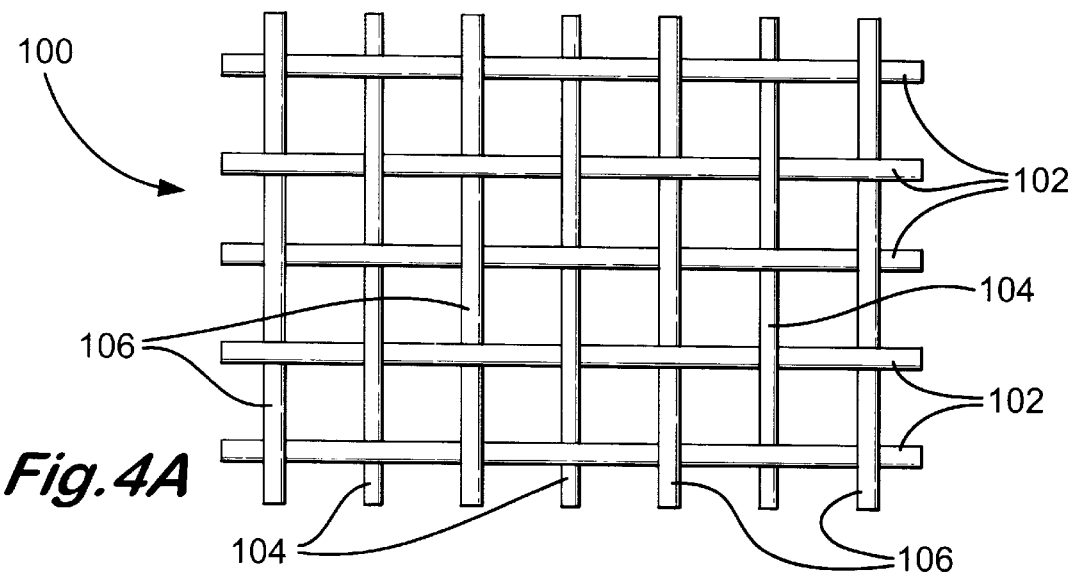
FIG. 4A is a top view of a screen according to the present invention.
Figure 4B:
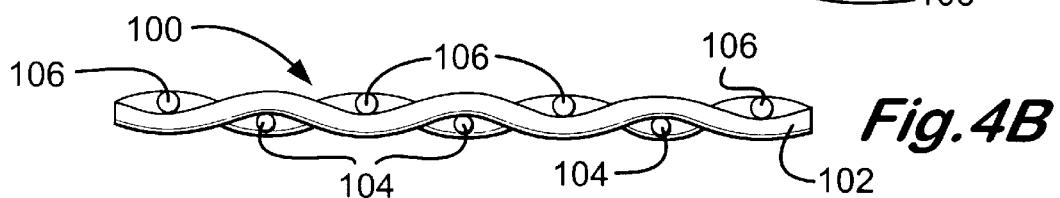
FIG. 4B is a cross-section view of the screen of FIG. 4A.

FIG. 4A shows a screen 100 according to the present invention for use in a vibratory separator, e.g., but not limited to, a shale shaker. The screen has a square mesh pattern with a plurality of wires 102 in one direction (shut direction) each of substantially the same cross-sectional diameter, e.g. ranging between about 0.0126 inches and about 0.0010 inches. The screen has a plurality of wires 104 in a direction orthogonal to that of the wires 102. The wires 104 have a cross-sectional diameter similar to that of the wires 102. Spaced-apart by the wires 104 and by space therebetween is a plurality of support wires 106 with a cross-sectional diameter larger than that of the wires 104. In certain embodiments the diameter of the wires 106 ranges between about 0.0126 inches and about 0.0010 inches. In certain aspects the diameter of the wires 106 is at least 1.15 times larger than the diameter of the wires 104.

Figure 5A:
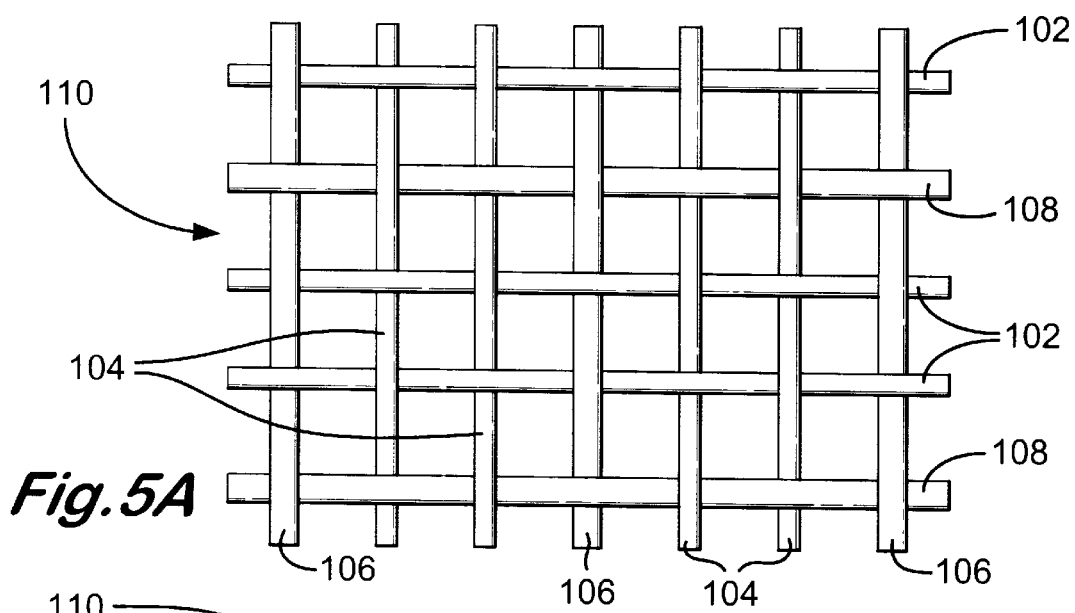
FIG. 5A is a top view of a screen according to the present invention.
Figure 5B:
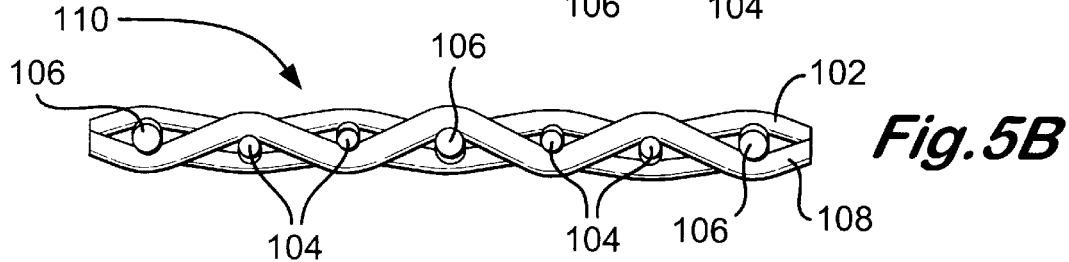
FIG. 5B is a cross-section view of the screen of FIG. 5A.
Figure 9:
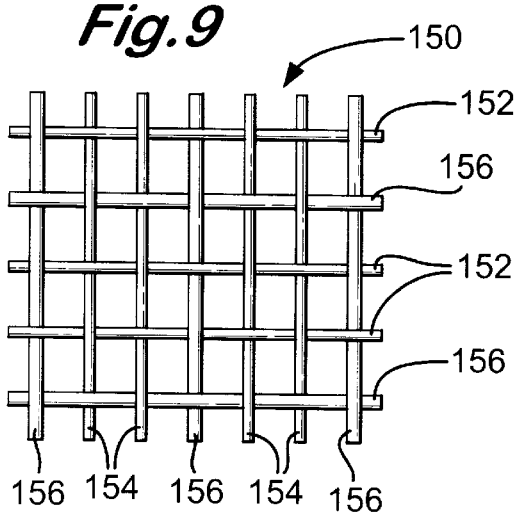
FIGS. 9–13 are top views of screens according to the present invention.
Figure 10:
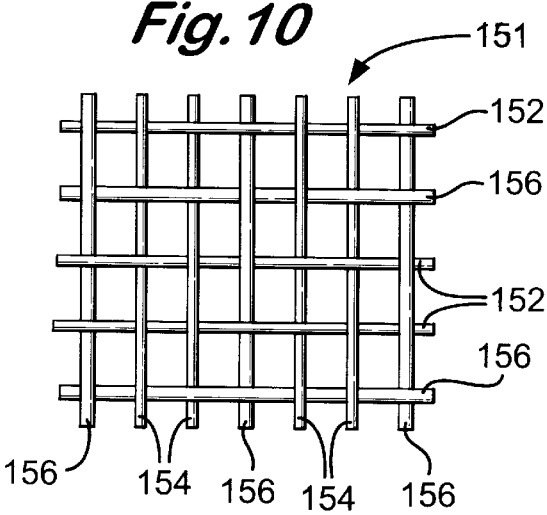
Figure 11:
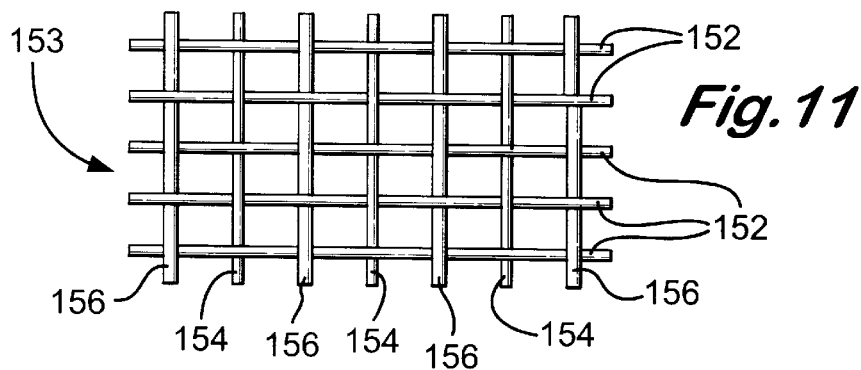
Figure 12:
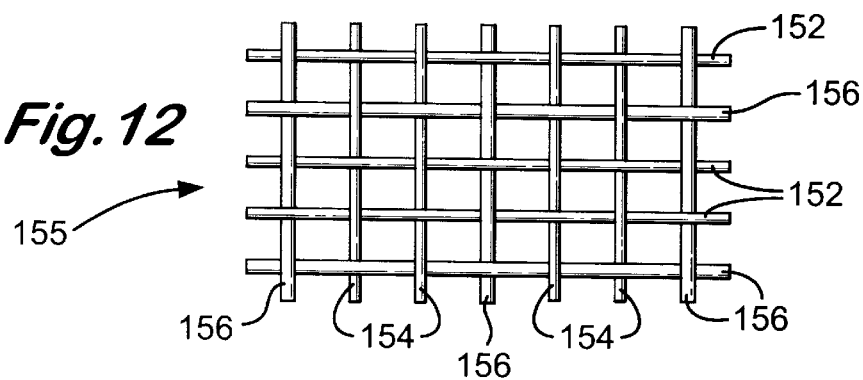
Figure 13:
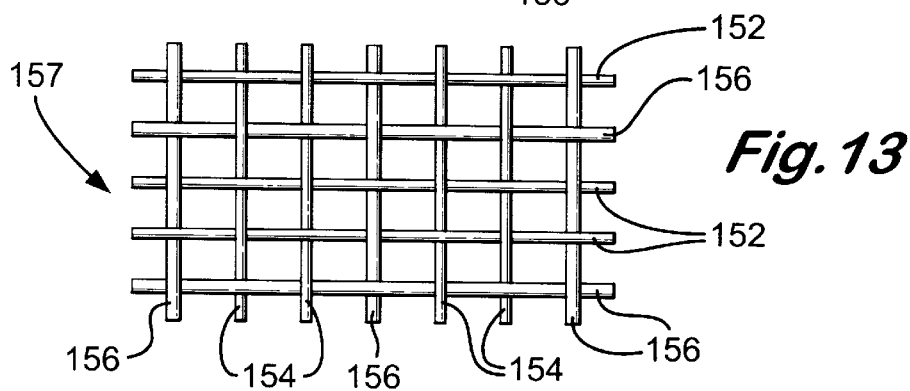

A screen 110 shown in FIGS. 5A and 5B is like the screen 100, but the larger diameter wires 106 are every third wire in the wart direction, rather than every other wire as in the screen 100. Also every third wire 108 in the shute direction is a larger diameter wire like the wires 106. The same numerals in FIGS. 4A and 5A indicate the same parts.

FIG. 6A shows a screen 120 according to the present invention with a twill mesh pattern with every third wire 126 (like the wires 106, FIG. 4A) in both directions of a larger diameter than the remaining wires 122 and 124 (like the wires 102, 104 respectively, FIG. 4A).

FIG. 7 shows a screen 130 with all larger diameter wires 136 (like the wires 106, FIG. 4A) in the shute direction and every other wire in the warp direction of larger diameter. Every other wire 134 in the warp direction is a smaller diameter wire (like the wires 102, 104, FIG. 4A).

FIG. 8 shows a screen 140 according to the present invention with a rectangular mesh pattern with every other wire in the warp direction a larger diameter wire 146 (like the wires 106, FIG. 4A) and smaller diameter wires 142 and 144 (like the wires 102, 104 respectively, FIG. 4A).

FIG. 9–13 show screens 150, 151, 155, and 157 respectively, each with a rectangular mesh pattern, with larger diameter wires 156 (like the wires 106, FIG. 4A) and smaller diameter wires 152, 154 (like the wires 102, 104 respectively, FIG. 4A).

Figure 1B:
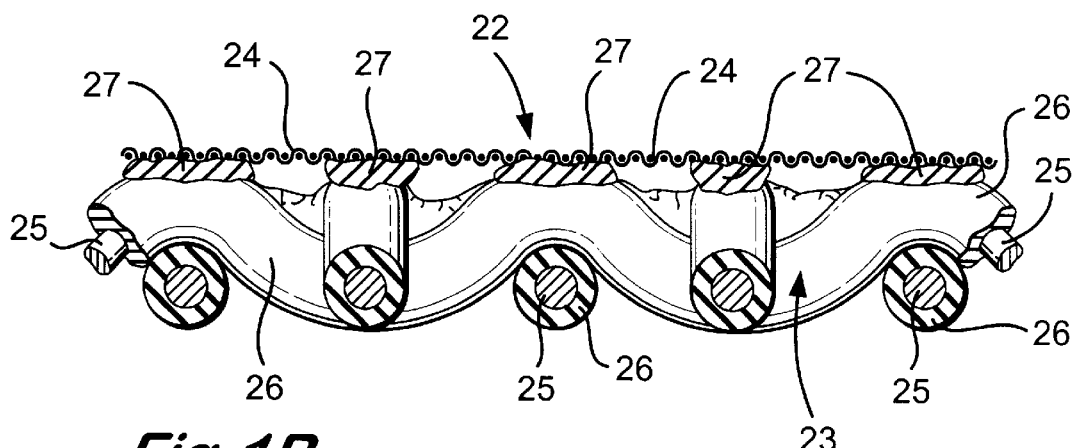
FIG. 1B is a cross-section view of the screen of FIG. 1A.
Figure 14:
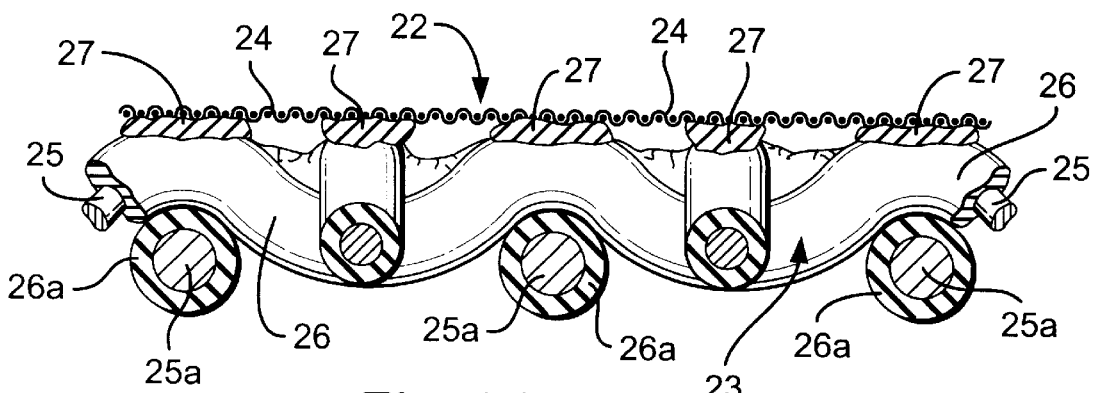
FIG. 14 is a cross-section view of a screen according to the present invention.

FIG. 14 shows a screen 160 according to the present invention like the screen of U.S. Pat. No. 2,723,032, but with alternating larger diameter wires 25a instead of the wires 25 as shown in FIGS. 1A–1B. The coating 26a is larger than the coating 26 shown in FIG. 1B. It is also within the scope of this invention for the upper screen layer of the screen 22 to be of any screen material according to the present invention.

Figure 2A:
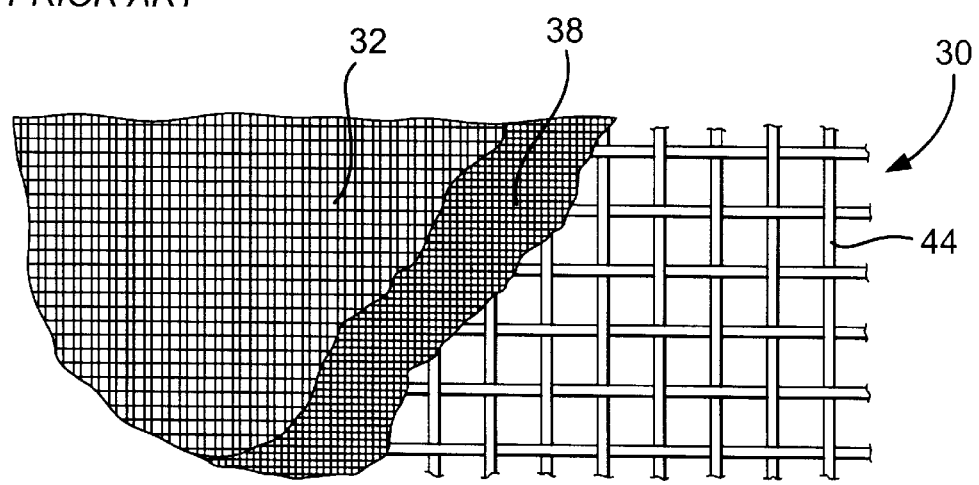
FIG. 2A is a top view, partially cut away of a prior art screen.
Figure 2B:
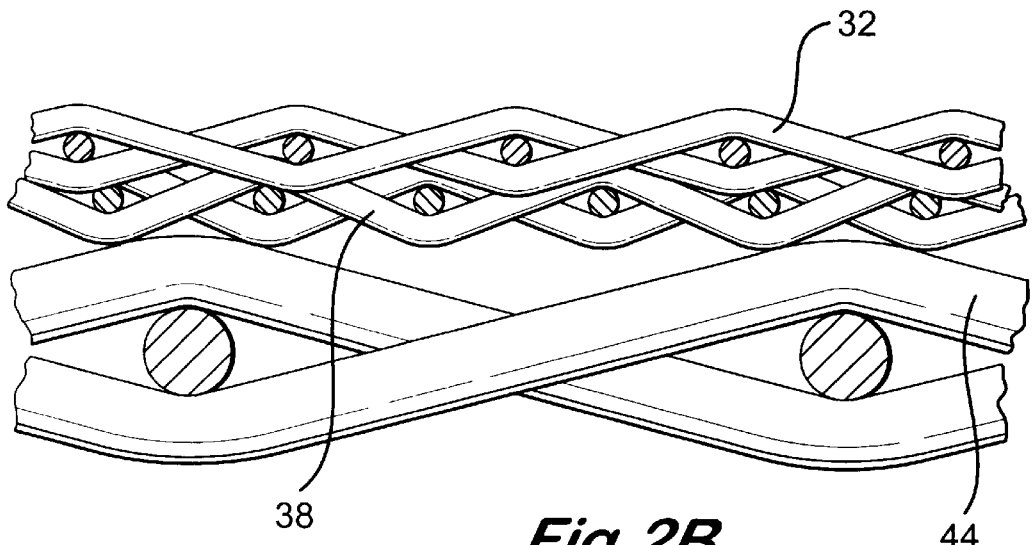
FIG. 2B is a cross-section view of the screen of FIG. 2A.
Figure 15:
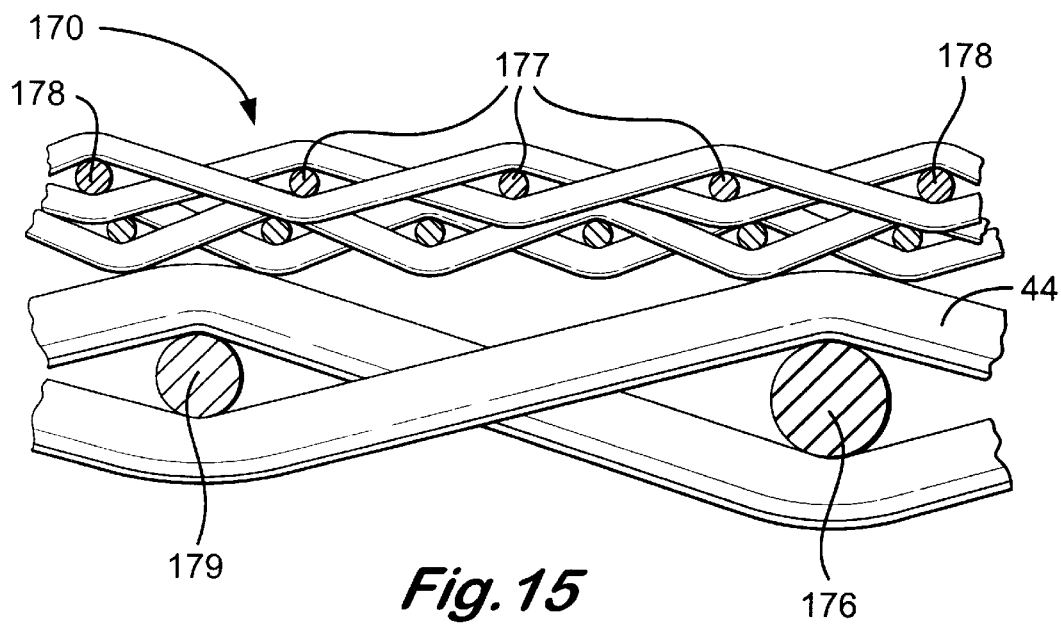
FIG. 15 is a cross-section view of a screen according to the present invention.

FIG. 15 shows a screen 170 according to the present invention like the screen of U.S. Pat. No. 4,696,751 (incorporated fully herein for all purposes) (FIGS. 2A and 2B), but with larger diameter wires 176 (every other wire) between the wires 179 [in the layer 44 (FIGS. 2A, 2B)] and with every fourth wires 178 in the top layer of screen material larger in cross-sectional diameter than the remaining wires 177 in that layer. The wires 176 may be eliminated; the layer 44 may be eliminated; and/or the wires 178 may be eliminated—all according to the present invention. It is also within the scope of the present invention to use any screening material disclosed herein for all of the fine screening layers of the screen 170.

Figure 3A:
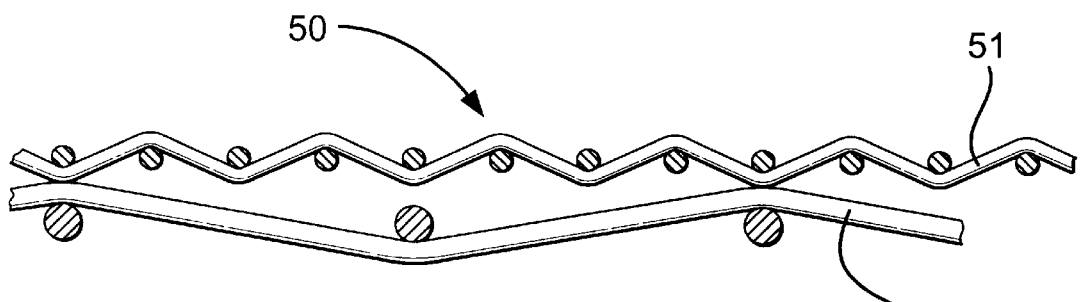
FIG. 3A is a cross-section view of a prior art screen.
Figure 3B:
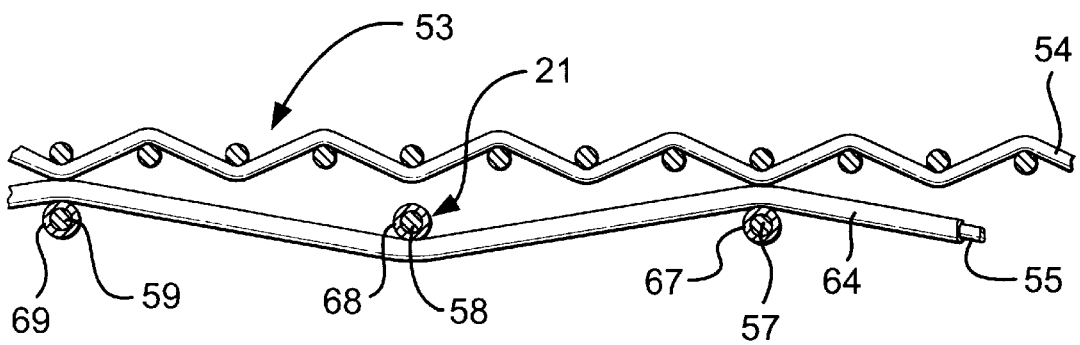
FIG. 3B is a cross-section view of a prior art screen.
Figure 16:
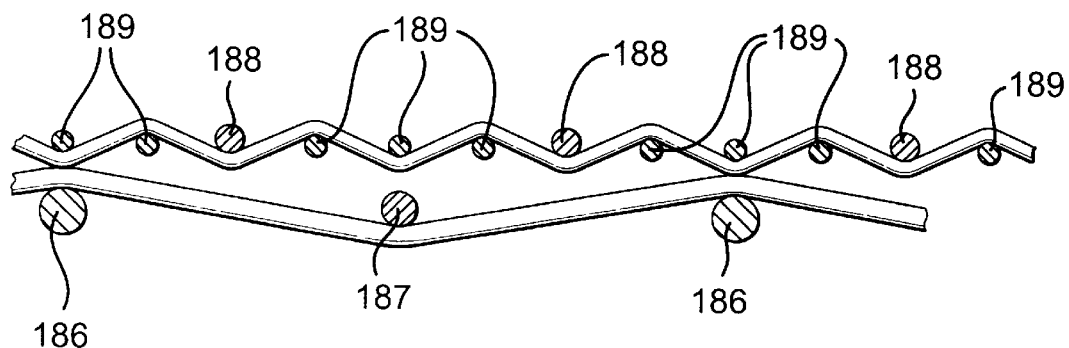
FIG. 16 is a cross-section view of a screen according to the present invention.

FIG. 16 shows a screen 180, like the screen of U.S. Pat. No. 5,626,234 (incorporated fully herein for all purposes) shown in FIG. 3A, but with larger diameter wires 186 in the lower screening layer between smaller diameter wires 187 and larger diameter wires 188 in the upper screening layer between smaller diameter wires 189. Either plurality of larger diameter wires may be eliminated and the lower layer of screening material may be eliminated.

Figure 17A:
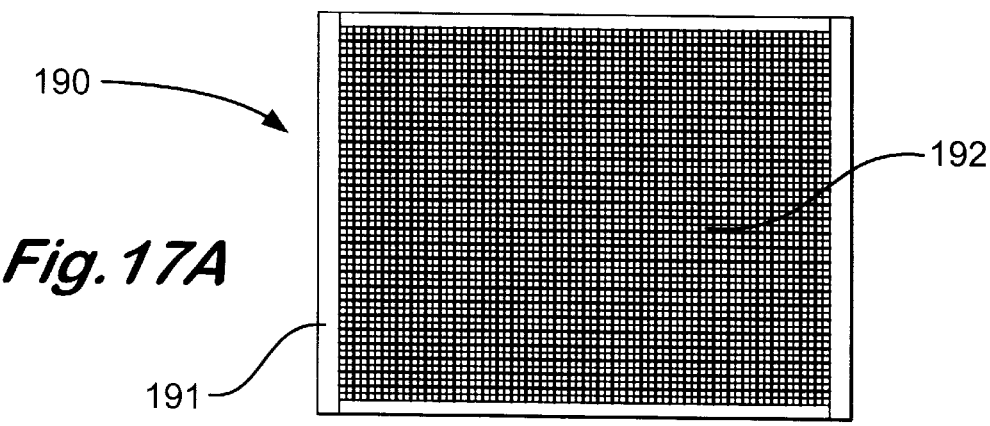
FIG. 17A is a cross-section view of a screen according to the present invention.
Figure 17B:
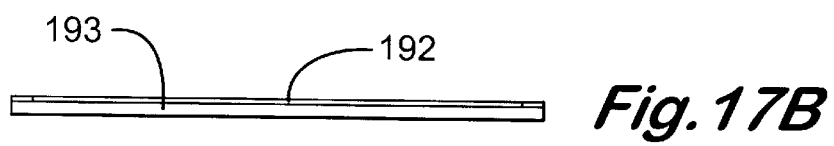
FIG. 17B is a side view of the screen of FIG. 17A.

FIGS. 17A and 17B show a screen 190 according to the present invention with an optional outer frame 191 (like any frame disclosed in the prior art) with screening material 192 mounted thereto (like any screening material according to the present invention disclosed herein). Item 193 shown schematically in FIG. 17B indicates any known lower supporting apertured plate, perforated plate, series of straps or strips, strip member or coarse supporting mesh, which is optional for the screen 190. It is within the scope of this invention to have additional layers of screening material (one, two or more) according to the present invention above or below the layer of screening material 192. Any screen 190 with two or more layers of screening material may have the layers interconnected, bonded to each other, and/or sintered together in any known manner. Any known hookstrip (e.g. angled, L-shaped, C-shaped, etc.) may be used with the screen 190 and with any screen according to the present invention.

Figure 18:
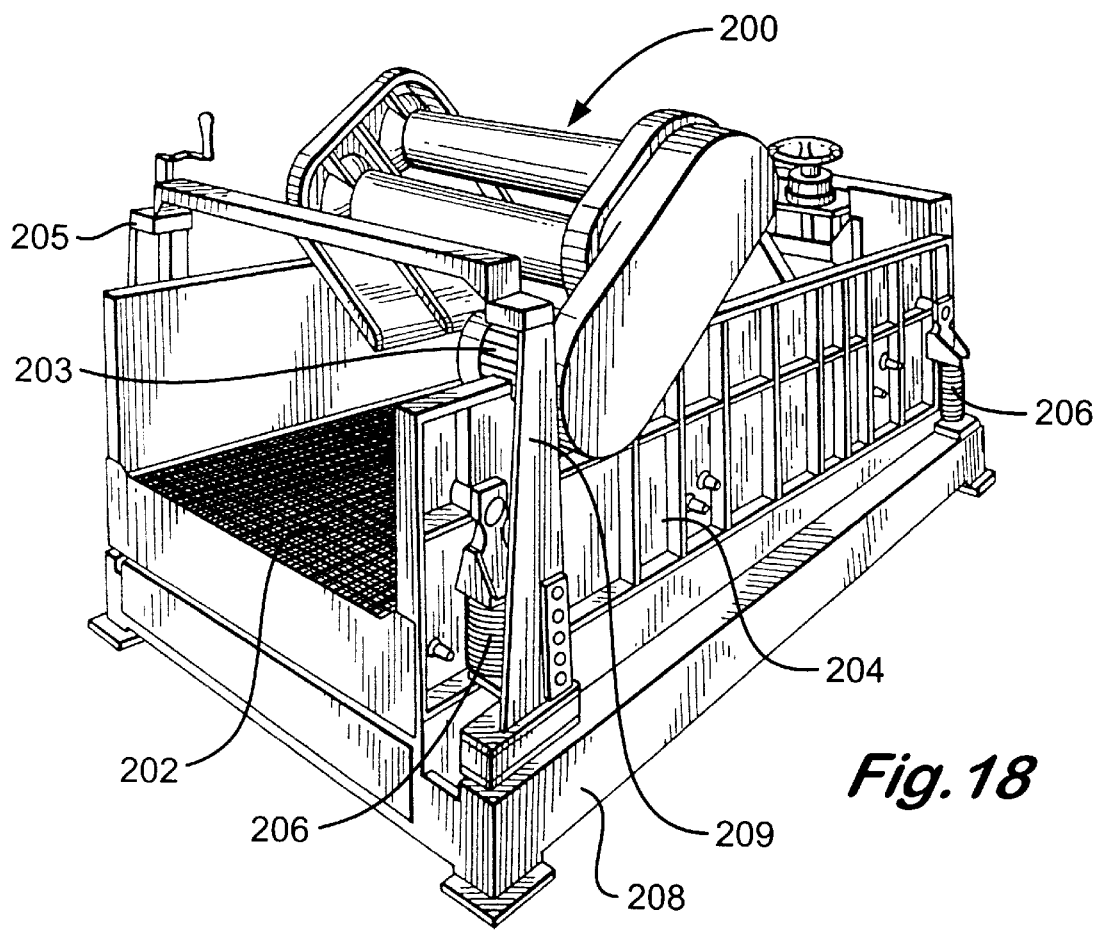
FIG. 18 is a perspective view of a shale shaker with a screen according to the present invention.

FIG. 18 shows a vibratory separator system 200 according to the present invention that has a screen 202 (like any screen disclosed herein) according to the present invention mounted on vibratable screen mounting apparatus or "basket" 204. The screen 202 may be any screen disclosed herein or have any combination of any feature or features of any screen or screen part disclosed herein; and any such screen may be used with any appropriate shaker or screening apparatus. The basket 204 is mounted on springs 206 (only two shown; two as shown are on the opposite side) which are supported from a frame 208. The basket 204 is vibrated by a motor 203 and interconnected vibrating apparatus 209 which is mounted on the basket 204 for vibrating the basket and the screens. Elevator apparatus 205 provides for raising and lowering of the basket end.

For any screen according to the present invention the warp wires and/or shute wires and/or support wires may be made from material from the group consisting of metal, steel, stainless steel, copper, bronze, brass, aluminum, aluminum alloy, zinc, zinc alloy, platinum, titanium, plastic, fiberglass, and polytetrafluoroethylene.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A method for separating fluid and fibrous lost circulation material from a mixture of fluid, drilled cuttings and fibrous lost circulation material, the method comprising
    introducing the mixture onto a screen assembly that is vibrating for passage of the fluid and fibrous lost circulation material through the screen assembly and for separation from the mixture of drilled cuttings, the screen assembly comprising at least two layers of screening material one on top of the other and including at least a first layer over a second layer, each layer having screen mesh with rectangular openings as viewed from above,
    the first layer having first rectangular openings, and the second layer having second rectangular openings,
    each of the first rectangular openings having a first width and a first length, and each of the second rectangular openings having a second width and a second length,
    the ratio of the first length to the first width ranging between 1.55 and 2.00,
    the ratio of the second length to the second width ranging between 1.55 and 2.00,
    the ratio of the first length to the second width ranging between 0.95 and 1.05, and
    the lengths of the first rectangular openings are parallel to lengths of the second rectangular openings.

2. The method of claim 1 wherein the ratio of the first length to the first width is about 1.6, the ratio of the second length to the second width is about 1.7, and the ratio of the first length to the second width is about 1.0.

3. The method of claim 1 wherein the screen assembly has a screen support.

4. The method of claim 3 wherein the screen support includes a series of spaced-apart strips.

5. The method of claim 3 wherein the screen support includes a perforated plate.

6. The method of claim 3 wherein the screen support includes a frame.

7. The method of claim 6 wherein the frame includes two pairs of parallel spaced-apart sides forming a four-sided outer frame member and a plurality of spaced-apart crossmembers, each crossmember extending from one side of one of the pairs of parallel spaced-apart sides of the outer frame member to an opposing parallel side thereof.

8. The method of claim 1 wherein the mesh of the first layer is bonded to the mesh of the second layer.

9. The method of claim 1 wherein the mesh of the first screen is mechanically connected to the mesh of the second screen.

10. The method of claim 3 wherein at least one of the first screen and second screen is bonded to the screen support.

11. The method of claim 3 wherein at least one of the first screen and second screen is mechanically connected to the screen support.

12. The method of claim 1 wherein the mixture flows on the screen in a direction generally parallel to the length of the first layer's rectangular openings.

13. The method of claim 1 wherein the mixture flows on the screen in a direction generally parallel to the length of the second layer's rectangular openings.

14. The method of claim 1 wherein the screen assembly includes a third screening material layer connected to at least one of the first and second layers.

15. The method of claim 14 wherein the third screening material layer comprises coarse mesh screening material.

16. The method of claim 1 wherein the fibrous lost circulation material includes material that swells and the method includes reducing the resident time of said fibrous lost circulation material in the screen assembly.

17. A method for separating fluid and fibrous lost circulation material from a mixture of fluid, drilled cuttings and fibrous lost circulation material, the method comprising
    introducing the mixture onto a screen assembly that is vibrating for passage of the fluid and fibrous lost circulation material through the screen assembly and for separation from the mixture of drilled cuttings, the screen assembly comprising at least two layers of screening material one on top of the other and including at least a first layer over a second layer, each layer having screen mesh with rectangular openings as viewed from above,
    the first layer having first rectangular openings, and the second layer having second rectangular openings,
    each of the first rectangular openings having a first width and a first length, and each of the second rectangular openings having a second width and a second length,
    the ratio of the first length to the first width ranging between 1.55 and 2.00,
    the ratio of the second length to the second width ranging between 1.55 and 2.00,
    the ratio of the first length to the second width ranging between 0.95 and 1.05, and
    the lengths of the first rectangular openings are parallel to lengths of the second rectangular openings,
    wherein the screen assembly includes a third screening material layer connected to at least one of the first and second layers,
    wherein the third screening material layer comprises coarse mesh screening material, and
    wherein the fibrous lost circulation material includes material that swells and the method includes reducing the resident time of said fibrous lost circulation material in the screen assembly.

18. A method for separating fluid and fibrous lost circulation material from a mixture of fluid, drilled cuttings and fibrous lost circulation material, the method comprising introducing the mixture onto a screen assembly that is vibrating for passage of the fluid and fibrous lost circulation material through the screen assembly and for separation from the mixture of drilled cuttings, the screen assembly comprising at least two layers of screening material one on top of the other and including at least a first layer over a second layer, each layer having screen mesh with rectangular openings as viewed from above, the first layer having first rectangular openings, and the second layer having second rectangular openings, each of the first rectangular openings having a first width and a first length, and each of the second rectangular openings having a second width and a second length, the ratio of the first length to the first width ranging between 1.55 and 2.00, the ratio of the second length to the second width ranging between 1.55 and 2.00, the ratio of the first length to the second width ranging between 0.95 and 1.05, and the lengths of the first rectangular openings are at an angle to lengths of the second rectangular openings.

19. The method of claim 18 wherein the ratio of the first length to the first width is about 1.6, the ratio of the second length to the second width is about 1.6, and the ratio of the first length to the second width is about 1.0.

20. The method of claim 18 wherein the screen assembly has a screen support.

21. The method of claim 20 wherein the screen support includes a series of spaced-apart strips.

22. The method of claim 20 wherein the screen support includes a perforated plate.

23. The method of claim 20 wherein the screen support includes a frame.

24. The method of claim 23 wherein the frame includes two pairs of parallel spaced-apart sides forming a four-sided outer frame member and a plurality of spaced-apart crossmembers, each crossmember extending from one side of one of the pairs of parallel spaced-apart sides of the outer frame member to an opposing parallel side thereof.

25. The method of claim 18 wherein the mesh of the first layer is bonded to the mesh of the second layer.

26. The method of claim 18 wherein the mesh of the first screen is mechanically connected to the mesh of the second screen.

27. The method of claim 20 wherein at least one of the first screen and second screen is bonded to the screen support.

28. The method of claim 20 wherein at least one of the first screen and second screen is mechanically connected to the screen support.

29. The method of claim 18 wherein the mixture flows on the screen in a direction generally parallel to the length of the first layer's rectangular openings.

30. The method of claim 18 wherein the mixture flows on the screen in a direction generally parallel to the length of the second layer's rectangular openings.

31. The method of claim 18 wherein the screen assembly includes a third screening material layer connected to at least one of the first and second layers.

32. The method of claim 31 wherein the third screening material layer comprises coarse mesh screening material.

33. The method of claim 18 wherein the fibrous lost circulation material includes material that swells and the method includes reducing the resident time of said fibrous lost circulation material in the screen assembly.

34. A method for separating fluid and fibrous lost circulation material from a mixture of fluid, drilled cuttings and fibrous lost circulation material, the method comprising introducing the mixture onto a screen assembly that is vibrating for passage of the fluid and fibrous lost circulation material through the screen assembly and for separation from the mixture of drilled cuttings, the screen assembly comprising at least two layers of screening material one on top of the other and including at least a first layer over a second layer, each layer having screen mesh with rectangular openings as viewed from above, the first layer having first rectangular openings, and the second layer having second rectangular openings, each of the first rectangular openings having a first width and a first length, and each of the second rectangular openings having a second width and a second length, the ratio of the first length to the first width ranging between 1.55 and 2.00, the ratio of the second length to the second width ranging between 1.55 and 2.00, the ratio of the first length to the second width ranging between 0.95 and 1.05, and the lengths of the first rectangular openings are parallel to lengths of the second rectangular openings, wherein the screen assembly includes a third screening material layer connected to at least one of the first and second layers, wherein the third screening material layer comprises coarse mesh screening material, and wherein the fibrous lost circulation material includes material that swells and the method includes reducing the resident time of said fibrous lost circulation material in the screen assembly.

* * * * *